United States Patent [19]
Bar-Noy et al.

[11] Patent Number: 5,524,136
[45] Date of Patent: Jun. 4, 1996

[54] TRACKING MOBILE USERS IN WIRELESS NETWORKS

[75] Inventors: Amotz Bar-Noy; Ilan Kessler, both of Bronx, N.Y.

[73] Assignee: International Business Machines Corporation, Armonk, N.Y.

[21] Appl. No.: 871,252

[22] Filed: Apr. 20, 1992

[51] Int. Cl.⁶ .......................... H04M 11/00; H04Q 7/00; H04B 1/00

[52] U.S. Cl. .................. 379/59; 379/58; 379/60; 455/33.1; 455/33.2; 455/33.4; 455/54.1; 455/54.2; 455/56.1

[58] Field of Search ................... 379/58, 59, 60; 455/33.1, 33.2, 33.4, 54.1, 54.2, 56.1

[56] References Cited

U.S. PATENT DOCUMENTS

| | | | |
|---|---|---|---|
| 4,475,010 | 10/1984 | Huensch et al. | 455/33.2 |
| 4,527,284 | 7/1985 | Rottger | 455/33.2 |
| 4,670,899 | 6/1987 | Brody et al. | 379/59 |
| 4,737,978 | 4/1988 | Burke et al. | 379/60 |
| 4,765,753 | 8/1988 | Schmidt | 455/33.2 |
| 4,876,738 | 10/1989 | Selby | 379/60 |
| 5,095,500 | 3/1992 | Tayloe | 379/59 |
| 5,175,867 | 12/1992 | Wejke et al. | 455/56.1 |
| 5,214,789 | 5/1993 | George | 379/60 |
| 5,218,367 | 6/1993 | Sheffer | 379/59 |
| 5,218,716 | 6/1993 | Comroe | 379/59 |
| 5,222,248 | 6/1993 | McDonald et al. | 455/33.2 |
| 5,239,676 | 8/1993 | Strawczynski | 379/60 |
| 5,243,598 | 9/1993 | Lee | 455/33.1 |

Primary Examiner—Stephen Chin
Assistant Examiner—Vijay Shankar
Attorney, Agent, or Firm—Douglas W. Cameron; Ronald L. Drumheller

[57] ABSTRACT

A method and apparatus for efficiently tracking the location of a mobile station in a cellular network, especially in cellular networks having nonuniform traffic distribution. A mobile station reports to a base station only upon entering selected reporting cells. When communication with a mobile station is desired, the station is searched for in the vicinity of the last reporting cell in which the station appeared. The vicinity of a reporting cell is defined as the set of all intersecting cells reachable from the reporting cell without passing through another reporting cell.

8 Claims, 3 Drawing Sheets

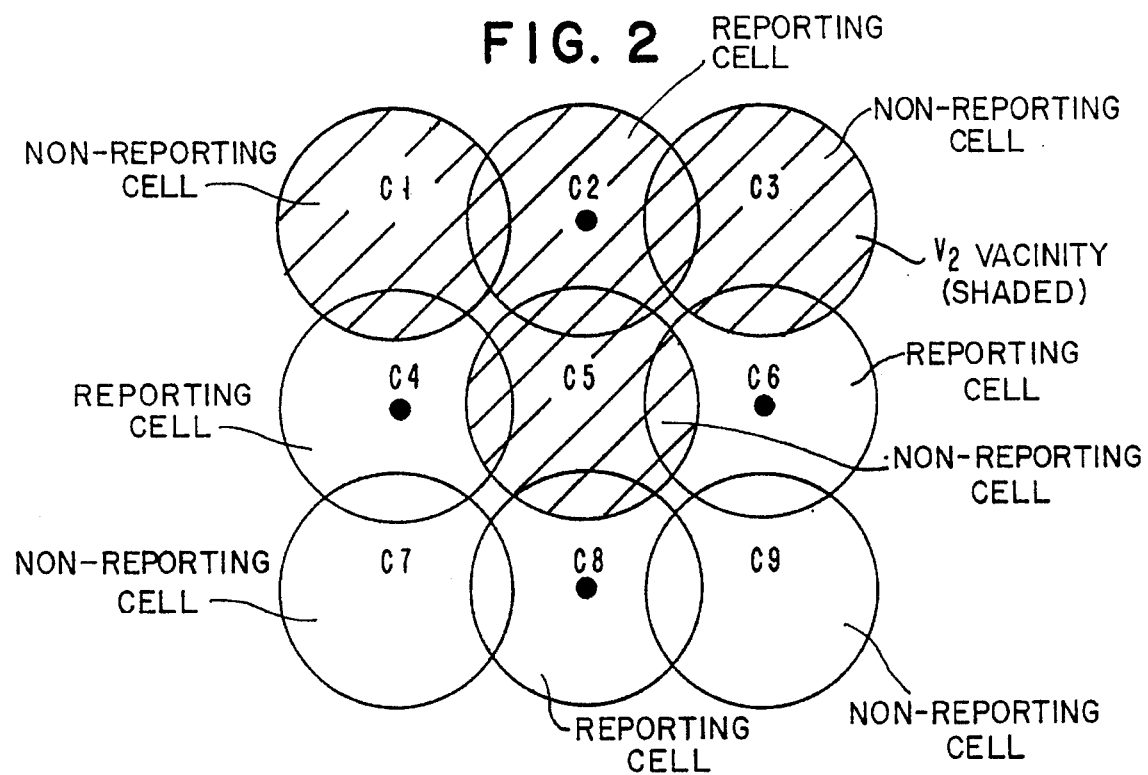
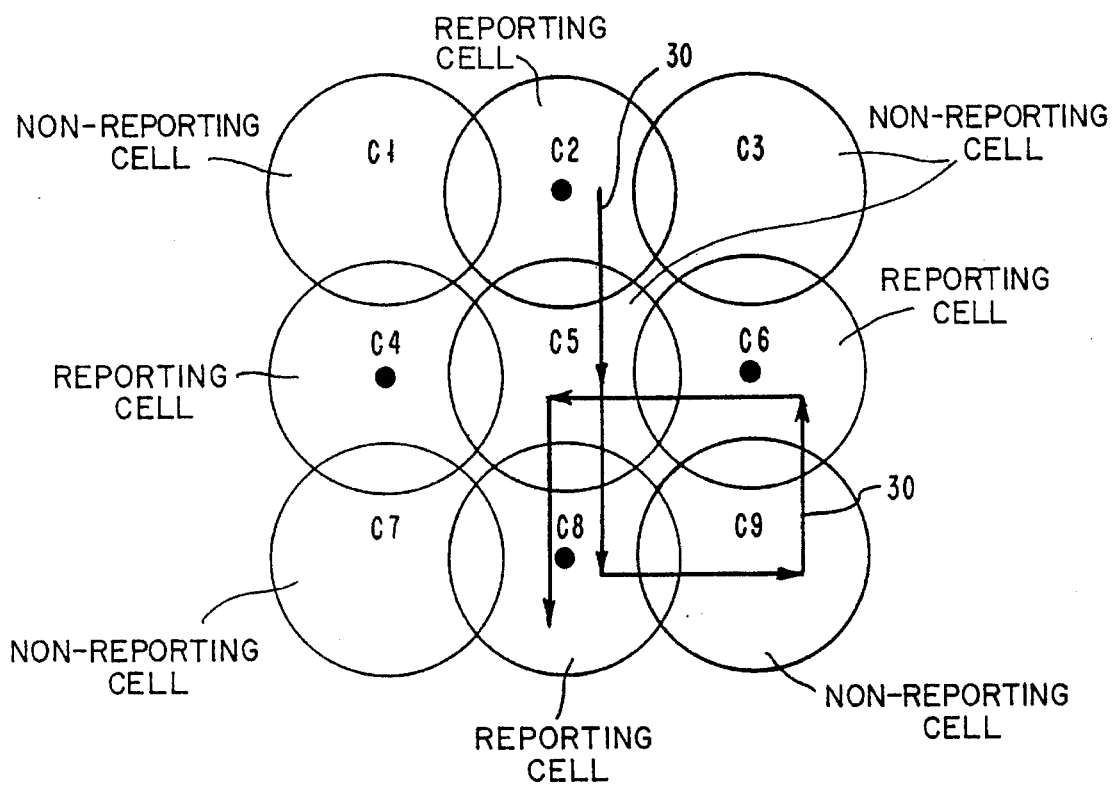

TRACKING MOBILE USERS IN WIRELESS NETWORKS

DESCRIPTION

1. Technical Field

This invention relates to a method of tracking mobile stations in a cellular network having non-uniform traffic distribution over the geographical area of the network.

2. Description of the Prior Art

Cellular mobile communications are exploding throughout the world, and are now an established part of many communications networks. Future mobile wireless networks are at present a topic of intense interest for research and development.

The cellular architecture is a two-level hierarchical structure—a level consisting of mobile stations and a level comprising fixed stationary base stations. The mobile stations are the devices that are used by the mobile users in order to communicate with the fixed network as well as to communicate with each other. The base stations are fixed devices that on one side communicate with the mobile stations through wireless links, and on the other side are connected to the fixed network by wired links. The collection of base stations together with the fixed network form a wired backbone of the wireless network. Associated with each base station, there is a geographic area, called cell, within which a mobile user can communicate with that base station. In order to cover the entire area and to insure continuity of communications, cells must overlap. For more details on cellular networks see [1].

In mobile cellular networks the users move continually within the geographic area covered by the network. Therefore, the location of any particular user may not be known at a time when a message has to be delivered to that user. A possible solution to this problem is to force each user to transmit an update message whenever it moves to a new cell (this solution is used by Ericsson in its Mobitex network [2], and is also described in [3]). However, such a solution is too expensive for certain networks, as it implies too many transmissions of updating messages. Such networks include those in which there are a large number of highly mobile users and very small cells, and also networks in which transmissions of the mobile units are very costly.

Examples of networks that possess the above two properties are indoor mobile wireless networks. In these networks, the typical size of a cell can be the size of an office. For example, if the physical channel is based on infrared technology, then the line-of-sight requirement makes it impossible to have cells that are larger than the size of a room. In addition, in such networks the mobile units are hand-held and therefore operate on batteries. This implies a power budget limitation which makes transmissions very costly (transmission consumes much more energy than any other operation).

A possible solution that could have been considered for such networks is that mobile users never update the system regarding their locations. Clearly, this solution avoids the problem of too many updating transmissions. However, adopting this solution implies that whenever there is a message to be delivered to a particular user, a network-wide search for that user is performed. Such a search is again a very expensive operation.

Thus, there are two basic operations involved in tracking mobile users, namely, update and find. With each of these operations there is a certain cost associated. The two extreme solutions described above demonstrate the fact that decreasing one of these two costs necessitates increasing the other one. In other words, the more updating messages are sent by the mobile users, the less the system has to search for the users, and vice versa. The problem addressed by this invention is the design of an efficient scheme, i.e. a scheme with a low total cost, for tracking mobile users.

There exist tracking schemes in prior art which are neither one of the two extreme solutions described above. One scheme is described in U.S. Pat. No. 4,456,793. The mechanism described in this patent is based on periodical polling of the mobile users by the cellular system. However, there is no attempt to optimize the above total cost. Another scheme is described in U.S. Pat. No. 4,775,999. In this patent, the entire network is partitioned into paging areas, each of which consists of a number of cells. The mobile users send an update message only when moving from one paging area to another (the only exception to this rule is that mobile users transmit an update message at least once a day). The paging areas in this solution are given, and are not subject to design. Thus, no attempt to optimize the total cost is made.

Another scheme is presented in [4], which is a copending application currently identified as IBM Docket Number YO990-029 and which is to be filed on the same day as the current application. This other scheme is designed to provide dynamic adaptation to mobile station movements, while the current application is designed for geographically nonuniform traffic patterns in cellular network.

U.S. Pat. No. 4,723,266 to Perry discloses a method of reducing the number of control channels when cell splitting takes place. The solution disclosed is to set up each call in the original large cell and then to handoff the call to one of the new smaller cells.

U.S. Pat. No. 4,843,622 to Yotsutani et al. discloses a method of searching over the entire network for a specific mobile unit. This searching is done according to some predetermined order among the given zones, where the essence of the method is to search simultaneously in non-overlapping zones (cells). The patent mentions update messages that are sent from mobiles to base stations; however, it does not specify any rules regarding when such messages are to be sent.

SUMMARY OF THE INVENTION

It is an object of this invention to provide a mobile station tracking system which allows for efficient use of available bandwidth in a cellular network having high density traffic patterns in a number of cells.

Accordingly, this invention provides a method and apparatus for tracking mobile stations in a cellular network. With this invention a number of the cells of the network are selected to be reporting cells. When a mobile station enters one of the reporting cells, a reporting signal identifying the location of the mobile station is sent to a base station of the network. When communications with a mobile station is desired, the mobile station is searched for in the vicinity of the last reporting cell from which the mobile station sent its last reporting signal to the base station. The vicinity of a reporting cell is defined as the set of all cells that are reachable from the reporting cell without passing through another reporting cell.

This invention allows one to eliminate reporting signals in cells that have highly congested traffic patterns, thereby preserving bandwidth for other uses.

BACKGROUND OF THE INVENTION

BRIEF DESCRIPTION OF THE DRAWINGS

FIG. 2 schematically illustrates the cells of a network with reporting cells and the vicinity of a reporting cell.

FIG. 3 illustrates the movement of a mobile station between cells of a network.

DESCRIPTION OF THE PREFERRED EMBODIMENT

The description of the solution consists of three parts: In the first part, the underlying cellular system is described. In the second part a general scheme for efficiently tracking mobile users is presented, and the notions of reporting centers and vicinities are introduced. In the third part, a specific procedure for selecting the reporting centers is described.

The System

Figure 1:
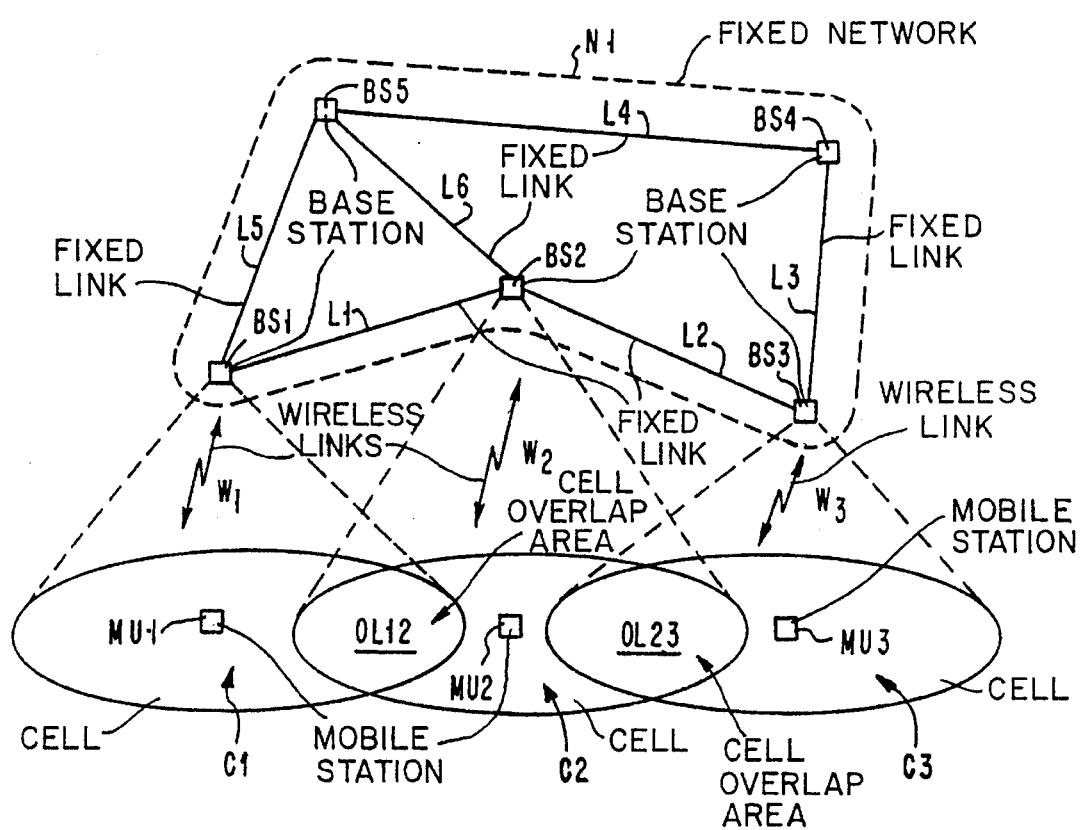
FIG. 1 schematically illustrates a cellular network.

The cellular architecture is a two-level hierarchical structure (See FIG. 1): a level consisting of mobile stations (MU1–MU3), and a level comprising fixed stationary base stations (BS1, . . . ,BS5). The mobile stations are the devices that are used by the mobile users in order to communicate with the fixed network (N1) as well as to communicate with each other. The base stations are fixed devices that on one side communicate with the mobile stations through wireless links (W1, . . . ,W3), and on the other side are connected to the fixed network by fixed links (L1, . . . ,L6). The wireless links (W1, . . . ,W3) can be based on any feasible technology, such as infrared or radio. The collection of base stations together with the fixed network form a backbone of the mobile network. Associated with each base station, there is a geographic area, called cell, within which a mobile user can communicate with that base station (C1–C3). For example, cell C1 is associated with base station BS1. In order to cover the entire area and to insure continuity of communications, cells must overlap. For example, cell C1 and cell C2 overlap in the area OL12, and cell C2 and cell C3 overlap in the area OL23. For more details on cellular networks see [1].

The term "user" and "mobile station" are used interchangeably in this application. More accurately, a search operation searches for a mobile station and reporting is accomplished by transmitting a signal to a base station from a mobile station.

The General Strategy

The basic strategy suggested in this disclosure is as follows. Among all base stations of the network, some base stations are selected and designated as reporting centers. A cell of a base station which is a reporting center is referred to as a reporting cell. The base stations that were designated as reporting centers transmit periodically on the wireless channel a short message which identifies them as such. Thus, each mobile user can learn whether it is in a reporting cell simply by listening to the transmissions of the base stations.

Consider a reporting cell RC1. We define the vicinity of cell RC1 to be the collection of all non-reporting cells that are reachable from cell RC1 without crossing another reporting cell. A cell x is said to be reachable from cell y, if there exists a sequence of cells $x=x_0, x_1, \ldots, x_k=y$, such that the cells $x_i$ and $x_{i+1}$ are overlapping for all $i=0,1,\ldots,k-1$. By definition, cell RC1 is also considered to be in the vicinity of itself.

FIG. 2 shows an example that demonstrates the notions of reporting centers and vicinities. In this example there are 9 cells denoted by C1, . . . ,C9. Cells C1 and C2 are an example of overlapping cells, whereas cells C1 and C5 are an example of non-overlapping cells. Cells C2,C4,C6,C8 are designated as reporting cells and each vicinity consists of four cells. For example, in the shaded area of FIG. 2, the vicinity V2 of the reporting center C2 consists of cells C1,C2,C3,C5. Note that cell C9, for instance, is not in the vicinity of reporting cell C2 since in order to reach cell C9 from cell C2 a mobile station must cross either the reporting cell C6 or the reporting cell C8. That is, cell C9 is not reachable from cell C1.

The rules for the update and the find operations as defined by the suggested strategy are as follows.

Update—Each time a mobile user enters a reporting cell, the user transmits an update message to the base station of that cell (which is a reporting center). No update messages are transmitted to base stations that are not reporting centers.

Find—Whenever there is a message to be delivered to a mobile user, this user is searched for in all cells that are in the vicinity of the reporting center to which the mobile station last reported.

The rationale behind this strategy is that if the last reporting center to which a mobile station had sent an update message is x, then the user must be in one of the cells that are in the vicinity of x. Thus, the search for any user is always restricted to the vicinity of some reporting center (which is a small subset of the whole network), while update messages are sent only from specific cells (the number of which is small compared to the total number of cells in the network).

In FIG. 3 we show an example that demonstrates the tracking strategy. In this example there are 9 cells denoted by C1, . . . ,C9, where cells C2,C4,C6,C8 are designated as reporting cells. Suppose that user MU1 moves along the path 30 consisting of cells C2,C5,C8,C9,C6,C5,C8. Then user MU1 reports initially in cell C2, then when it arrives at cells C8 and C6, and finally again in cell C8. Now assume that the system is looking for MU1 during each one of its two visits to cell C5. In the first visit, the system searches for MU1 in cells C1,C2,C3,C5 since this is the vicinity of cell C2, which is the last reporting center to which MU1 reported. In the second visit, the system searches for MU1 in the vicinity of reporting cell C6 which includes cells C3,C5,C6,C9.

The particular selection of the base stations to be designated as reporting centers determines the efficiency of the strategy. As was seen above, the cost of the find operation is directly related to the sizes of the vicinities. The size of a vicinity is defined as the number of cells in the vicinity. For example, the size of the vicinity of cell C2 is 4 since this vicinity is made up of 4 cells, namely, C1, C2, C3, and C5. The cost of the update operation is related to the number of reporting centers, or more generally, to the "weights" of the reporting centers (as will be explained shortly). Therefore, one would like to select the reporting centers in such a way that both the sizes of the vicinities and the total weight of the reporting centers are minimized. However, these are contradicting goals in general, as in order to decrease the sizes of the vicinities, the number of reporting centers should be increased (and vice versa). In the next section we describe a procedure for selecting the reporting centers, which yields an efficient solution.

Selecting the Reporting Centers

The number of update messages that are transmitted during any time interval is the number of times that mobile users enter reporting cells during this time interval. Thus, if we define the weight of each cell to be the traffic intensity of mobile users into this cell, then the cost of the update operation is the sum of weights of all reporting cells.

The first step in selecting reporting centers is to associate with each cell x a weight w(x). The exact way in which this step is implemented is irrelevant to the present invention, and is up to the designer of the system. However, each w(x) should reflect the traffic intensity of mobile users into cell x. For example, w(x) can be chosen to be the average number of users entering cell x during a predetermined time interval (such as 1 hour, 1 day, etc.). Such average numbers can be easily determined through statistical measurements made by the network during the initial phase of operation. Again, the exact method of calculating average numbers is left as a degree of freedom to the designer of the system.

Our approach in designing an algorithm for selecting reporting centers is the following. The designer of the system has to determine what is the largest size of vicinity z that can be tolerated. This determines the maximal time needed to search for any mobile station. The exact way how the number z is computed is up to the designer of the system. Once z has been determined, the problem is to find a set of reporting centers the total weight of which is minimal, such that the size of every vicinity does not exceed z. In what follows we describe an algorithm which yields a near-optimal solution for this problem.

The Algorithm

Figure 4:
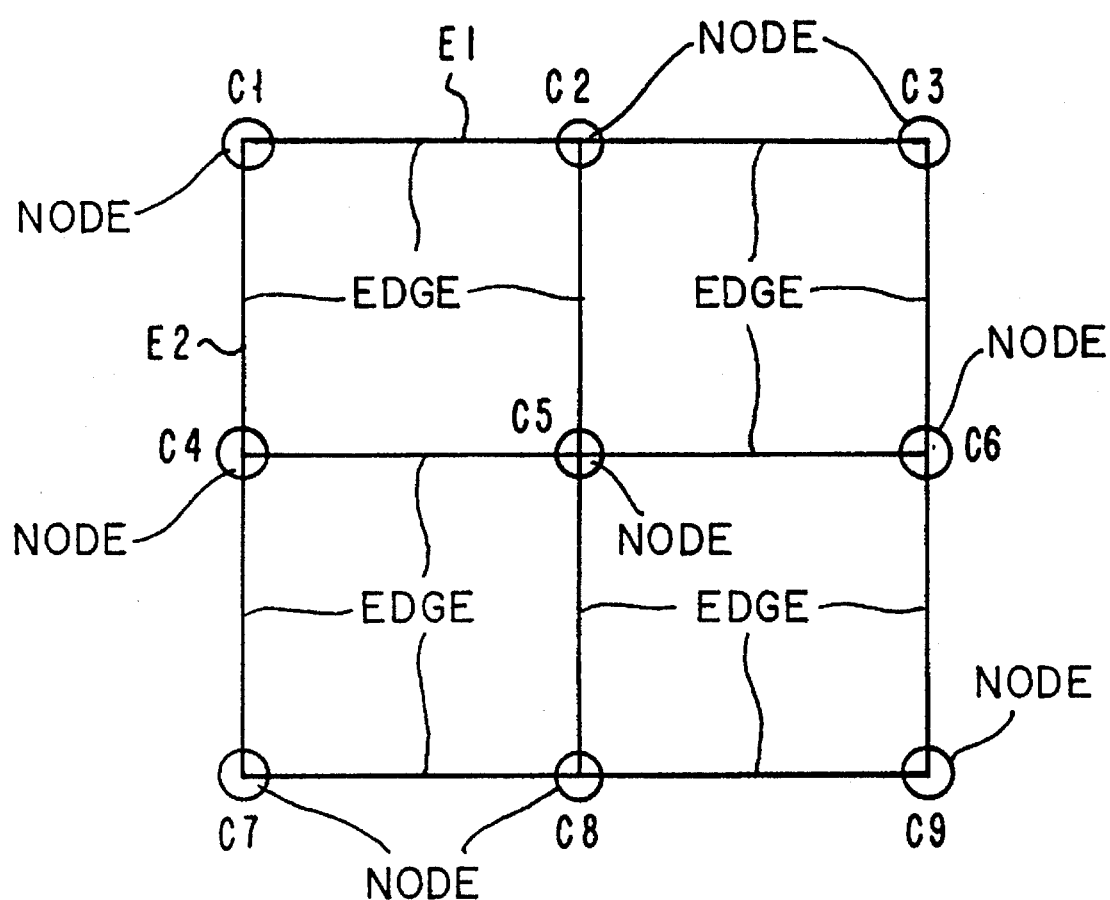
FIG. 4 illustrate the interference graph of the network depicted in FIG. 3.

The input to the algorithm is the topology of the network, the weights of the cells, and a parameter z. The topology of the network is represented by the interference graph. See FIG. 4. In this graph, the N nodes, labelled C1 through C9, correspond to the cells, C1 through C9, and there is an edge joining between two vertices if and only if the two corresponding cells overlap. For example, in the graph which is the interference graph of the network illustrated in FIG. 3, cell C1 is jointed to cell C2 and C4 by a single edge, E1 and E2 respectively, since cell C1 overlaps with both cells C2 and C4. The output of the algorithm is a set of reporting cells such that the size of every vicinity is less than or equal to z. The basic idea behind the algorithm is the following. Initially all cells are designated as reporting cells. Then, the cells are considered in an order of decreasing weights, and if making a cell a non-reporting cell does not create a vicinity larger than z, then this cell is made a non-reporting cell.

Let the cells of the network be denoted by C1, ..., CN. Without loss of generality assume that $w(C1) \geq w(C2) \geq \ldots \geq w(CN)$. Let C be a set of cells in the network. We define Z(C) to be the size of the largest vicinity had the set of reporting cells been C. The following is a high-level description of the algorithm.

1. C:={C1, ..., CN}
2. x:=1
3. If $Z(C-\{Cx\}) \leq z$ then C:=C−{Cx}
4. x:=x+1
5. If $x \leq N$ then go to step 3
6. Return the set C The algorithm attains a total weight that is at most $\Delta z^2$ times the total weight attained by any optimal algorithm, where $\Delta$ is the maximal number of cells that overlap with any particular cell in the network. In practical networks, both $\Delta$ and z are bounded by small constants. Thus, our solution guarantees a set of centers the total weight of which is within a constant factor of the best possible total weight. Note that this is the worst case; there are networks in which this algorithm produces an optimal solution. Note also that finding an optimal set of centers is a NP-complete problem, and therefore it is very unlikely that there is a simple algorithm (i.e. polynomial time implementation) which yields an optimal set of centers.

The other scheme, mentioned above, is presented in [4], and describes a dynamic strategy for tracking mobile users is suggested. This other scheme optimizes only user-associated costs, and does not address the problem of optimizing costs that are related to the entire network (e.g. load in congested cells).

References

1. William Lee, *"Mobile Cellular Telecommunication Systems"*, New York: Mc/Graw-Hill, 1989.
2. Proceedings of *IBM Wireless Communications Symposium*, Raleigh, N.C., Apr. 22–26, 1991.
3. K. Natarajan, *"Distributed Algorithms for Keeping Track of Mobile Users in a Wireless Network System with Multiple Overlapping Cells"*, IBM Docket YO990-117, Ser. No. 605,723, filed Oct. 29, 1990, and assigned to the IBM Corporation, the assignee of this current application.
4. A. Bar-Noy and I. Kessler, "Dynamic Strategies for Tracking Mobile Users in Wireless Networks", IBM Invention Disclosure Docket NO. YO992029, which is being filed concurrently with this application in the USPTO by the IBM Corporation, the same assignee as this application.

What is claimed is:

1. A method of tracking mobile users of a cellular network, comprising the steps of:

a. designating independently of any mobile user movements within cellular network a number of cells of said cellular network to be reporting cells and all other cells to be non-reporting cells, said number of reporting cells being less than the total number of cells of said cellular network;

b. sending a reporting signal from each of said mobile users only when said each of said mobile users enters one of said reporting cells, each said reporting signal identifying a location of a corresponding one of said mobile users; and c. searching for a mobile user only in the vicinity of the last corresponding reporting cell from which said mobile user sent a reporting signal, said searching being conducted when communication is desired with said mobile user, where the vicinity of said last corresponding reporting cell is the set of cells consisting of said last corresponding reporting cell and all non-reporting cells that are reachable by intercellular transitions of said mobile user travelling from said last corresponding reporting cell without having to enter any other reporting cell.

2. An apparatus for tracking mobile users of a cellular network, comprising:

a. means for designating independently of any mobile user movements within the cellular network a number of cells of said cellular network to be reporting cells and all other cells of said cellular network to be non-reporting cells, said number of reporting cells being less than the total number of cells of said cellular network;

b. means for sending a reporting signal from each of said mobile users only when said each of said mobile users enters one of said reporting cells, each said reporting signal identifying a location of a corresponding one of said mobile users; and c. means for searching for a mobile user only in the vicinity of the last corresponding reporting cell from which said mobile user sent a reporting signal, said searching being conducted when communication is desired with said mobile user, where the vicinity of said last corresponding reporting cell is the set of cells consisting of said last corresponding reporting cell and all non-reporting cells that are reachable by intercellular transitions of said mobile user travelling from said last corresponding reporting cell without having to enter any other reporting cell.

3. An apparatus for tracking inactive mobile users within a cellular network of cells without requiring each inactive mobile user to report whenever moving from one cell to another cell in the cellular network and without requiring a search of the whole cellular network when a message needs to be delivered from the cellular network to an inactive mobile user, comprising:

means for designating a number of the cells of said cellular network to be reporting cells and all other cells of said cellular network to be non-reporting cells, said number of reporting cells being less than the total number of cells of said cellular network;

means for sending a reporting signal to the cellular network from each of said inactive mobile users whenever and only whenever each said inactive mobile user enters one of said reporting cells, said reporting signal identifying said reporting cell entered by said each inactive mobile user as a most recent reporting cell corresponding to said each inactive mobile user; and means for searching for a desired inactive mobile user when a message needs to be sent to said desired inactive mobile user by searching for said desired inactive mobile user only in a vicinity of said most recent reporting cell corresponding to said desired inactive mobile user, said vicinity of said most recent reporting cell being a set of cells consisting of said most recent reporting cell corresponding to said desired inactive mobile user and all non-reporting cells that are reachable by a sequence of intercellular transitions from said most recent reporting cell corresponding to said desired inactive mobile user without entering any other reporting cell.

4. An apparatus as defined in claim 3 wherein said means for designating a number of the cells of said cellular network to be reporting cells includes means for periodically transmitting a message from each said reporting cell identifying said each reporting cell as a reporting cell.

5. An apparatus as defined in claim 4 wherein said means for sending a reporting signal to the cellular network from each of said inactive mobile users comprises means for each said inactive mobile user to receive said periodically transmitted message from any reporting cell entered by said each inactive mobile user and for transmitting a reporting signal whenever and only whenever said message received by said each inactive mobile user identifies a reporting cell different from said most recent reporting cell corresponding to said each inactive mobile user.

6. A method for tracking inactive mobile users within a cellular network of cells without requiring each inactive mobile user to report whenever moving from one cell to another cell in the cellular network and without requiring a search of the whole cellular network when a message needs to be delivered from the cellular network to an inactive mobile user, comprising the steps of:

designating a number of the cells of said cellular network to be reporting cells and all other cells of said cellular network to be non-reporting cells, said number of reporting cells being less than the total number of cells of said cellular network;

sending a reporting signal to the cellular network from each of said inactive mobile users whenever and only whenever each said inactive mobile user enters one of said reporting cells, said reporting signal identifying said reporting cell entered by said each inactive mobile user as a most recent reporting cell corresponding to said each inactive mobile user; and searching for a desired inactive mobile user when a message needs to be sent to said desired inactive mobile user by searching for said desired inactive mobile user only in a vicinity of said most recent reporting cell corresponding to said desired inactive mobile user, said vicinity of said most recent reporting cell being a set of cells consisting of said most recent reporting cell corresponding to said desired inactive mobile user and all non-reporting cells that are reachable by a sequence of intercellular transitions from said most recent reporting cell corresponding to said desired inactive mobile user without entering any other reporting cell.

7. A method as defined in claim 6 wherein said step of designating a number of the cells of said cellular network to be reporting cells includes the step of periodically transmitting a message from each said reporting cell identifying said each reporting cell as a reporting cell.

8. A method as defined in claim 7 wherein said step of sending a reporting signal to the cellular network from each of said inactive mobile users includes the steps of:

receiving by each said inactive mobile user said periodically transmitted message from any reporting cell entered by said each inactive mobile user; and transmitting a reporting signal whenever and only whenever said message received by said each inactive mobile user identifies a reporting cell different from said most recent reporting cell corresponding to said each inactive mobile user.

\* \* \* \* \*